(12) United States Patent
Berg et al.

(10) Patent No.: US 8,010,479 B2
(45) Date of Patent: Aug. 30, 2011

(54) SIMPLIFYING THE CREATION OF USER-DEFINED CUSTOM ELEMENTS FOR USE IN A GRAPHICAL MODELING APPLICATION

(75) Inventors: Daniel C. Berg, Holly Springs, NC (US); Brad L. Blancett, Raleigh, NC (US); Michael D. Elder, Durham, NC (US); Chad M. Holliday, Holly Springs, NC (US); Narinder Makin, Morrisville, NC (US); Timothy A. Pouyer, Greenville, SC (US); Edward C. Snible, Bronx, NY (US); John E. Swanke, Terryville, CT (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 12/141,495

(22) Filed: Jun. 18, 2008

(65) Prior Publication Data

US 2009/0319467 A1 Dec. 24, 2009

(51) Int. Cl.
G06F 17/00 (2006.01)
G06N 5/04 (2006.01)
(52) U.S. Cl. .......................................................... 706/60
(58) Field of Classification Search .................. 706/60
See application file for complete search history.

(56) References Cited

U.S. PATENT DOCUMENTS

| | | | |
|---|---|---|---|
| 6,256,773 B1 | 7/2001 | Bowman-Amuah | |
| 7,069,541 B2 | 6/2006 | Dougherty et al. | |
| 7,069,553 B2 | 6/2006 | Narayanaswamy et al. | |
| 7,092,950 B2 * | 8/2006 | Wong et al. | 1/1 |
| 7,134,122 B1 | 11/2006 | Sero et al. | |
| 7,174,536 B1 * | 2/2007 | Kothari et al. | 717/109 |
| 7,716,164 B2 * | 5/2010 | Stuhec | 707/805 |
| 7,716,255 B2 * | 5/2010 | Stuhec | 707/803 |
| 2009/0278847 A1 | 11/2009 | Berg et al. | |
| 2009/0319239 A1 | 12/2009 | Arnold et al. | |
| 2010/0030893 A1 | 2/2010 | Berg et al. | |
| 2010/0031247 A1 | 2/2010 | Berg et al. | |
| 2010/0058331 A1 | 3/2010 | Berg et al. | |
| 2010/0077328 A1 | 3/2010 | Berg et al. | |

OTHER PUBLICATIONS

A new knowledge representation method for Battle Management Language, Liangjun Ma; Lin Chen; Peng Lu; Yibo Gao; Yiping Yang; Fuzzy Systems and Knowledge Discovery (FSKD), 2010 Seventh International Conference on vol. 4 Digital Object Identifier: 10.1109/FSKD.2010.5569408 Publication Year: 2010 , pp. 1761-1766.*

(Continued)

*Primary Examiner* — Michael Holmes
(74) *Attorney, Agent, or Firm* — Patents On Demand, P.A.; Brian K. Buchheit; Scott M. Garrett

(57) ABSTRACT

The present invention can include a solution for capturing user-defined custom elements for use in a graphical modeling application. Such a system can include a graphical modeling application and a custom element definition tool. The graphical modeling application can be configured to create semantic models that contain a static graphical elements and semantic data elements. The custom element definition tool can be configured to create a user-defined custom element for the graphical modeling application. The user-defined custom element can consist of one or more static graphical element and/or one or more semantic data element.

20 Claims, 3 Drawing Sheets

OTHER PUBLICATIONS

Toward understanding natural language directions, Kollar, T.; Tellex, S.; Roy, D.; Roy, N.; Human-Robot Interaction (HRI), 2010 5th ACM/IEEE International Conference on Digital Object Identifier: 10.1109/HRI.2010.5453186 Publication Year: 2010 , pp. 259-266.*

Semantic Information Extraction of Video Based on Ontology and Inference, Jie Ma; Jing Zhang; Hong Lu; Xiangyang Xue; Semantic Computing, 2007. ICSC 2007. International Conference on Digital Object Identifier: 10.1109/ISCS.2007.17 Publication Year: 2007 , pp. 721-726.*

Leveraging Gene Ontology Annotations to Improve a Memory-Based Language Understanding System, Livingston, K.M.; Johnson, H.L.; Verspoor, K.; Hunter, L.E.; Semantic Computing (ICSC), 2010 IEEE Fourth International Conference on Digital Object Identifier: 10.1109/ICSC.2010.62 Publication Year: 2010 , pp. 40-45.*

Arnold, W., et al., "Pattern Based SOA Deployment," Proc. of 5th Int'l. Conf. on Service-Oriented Computing (ICSOC 2007), Sep. 17-20, 2007, Lecture Notes in Computer Science (LNCS), vol. 4749, Springer 2007.

Eilam, T, et al., "Reducing the Complexity of Application Deployment in Large Data Centers," Proc. of 9th IFIP/IEEE Int'l. Sym. on Integrated Network Management (IM 2005), pp. 221-234, May 15-19, 2005.

Corneil, D., et al., "An Efficient Algorithm for Graph Isomorphism," Journal of the ACM, vol. 17, pp. 51-64, Jan. 1970.

Ullman, J., "An Algorithm for Subgraph Isomorphism," Journal of the ACM, vol. 23, pp. 31-42, Jan. 1976.

Gati, G., "Further Annotated Bibliography on the Isomorphism Disease," Journal of Graph Theory,1979; pp. 96-109; vol. 3, pp. 96-109, 1979.

Messmer, B.T., "Efficient Graph Matching Algorithms," University of Bern, PhD thesis, Switzerland, Nov. 1995.

Tsai, W., et al., "Error-correcting Isomorphisms of Attributed Relational Graphs for Pattern Analysis," IEEE Transactions on Systems, Man, and Cybernetics, vol. SMC-9, No. 12, pp. 757-768, Dec. 1979.

* cited by examiner

SIMPLIFYING THE CREATION OF USER-DEFINED CUSTOM ELEMENTS FOR USE IN A GRAPHICAL MODELING APPLICATION

BACKGROUND OF THE INVENTION

The present invention relates to the field of graphical modeling applications, and, more particularly, to simplifying the creation of user-defined custom elements for use in a graphical modeling application.

Graphical modeling applications are popular tools for creating semantic models that are used across a wide variety of disciplines. Generally, a graphical modeling application includes a multitude of static graphical elements, objects and relationships that a user can manipulate when creating a semantic model. Through continued use of the graphical modeling application, users often realize that they are repeatedly creating certain configurations of static graphical elements.

To eliminate this repetitive process, graphical modeling applications often provide a mechanism for the user to save the selected elements as a custom element. However, the provided mechanisms are generally cumbersome and require the user to understand how to create the custom element using an application programming interface (API). Further, the user-defined custom element created by current mechanisms is static and unable to be shared among other users without repeating the creation process.

Attempts have been made to improve the process by which a user can define custom elements, such as storing the custom element as a template of the graphical modeling application. Current processes, however, still lack simplicity and fail to capture the semantic content of the element. That is, the graphical illustration of the custom element is captured without the additional data contained within the static graphical elements.

BRIEF SUMMARY OF THE INVENTION

The present invention can be implemented in accordance with numerous aspects consistent with the materials presented herein. One aspect of the present invention can include a system that simplifies the creation of user-defined custom elements for use in a graphical modeling application. Such a system can include a graphical modeling application and a custom element definition tool. The graphical modeling application can be configured to create semantic models that contain a static graphical elements and semantic data elements. The custom element definition tool can be configured to create a user-defined custom element for the graphical modeling application. The user-defined custom element can consist of one or more static graphical element and/or one or more semantic data element.

Another aspect of the present invention can include a method f system that simplifies the creation of user-defined custom elements for use in a graphical modeling application. Compositional and semantic data related to a user-selected static graphical element of a semantic model can be captured within a graphical modeling application. The captured data can be stored as a user-defined custom element within one or more custom element definition files. The custom element definition files can be stored in a user-specified location that is local to and accessible by the graphical modeling application. The user-defined custom element can be automatically registered with the graphical modeling application, making the user-defined custom element accessible within the graphical modeling application.

Still another aspect of the present invention can include a method for sharing user-defined custom elements for use in a graphical modeling application. The user-defined custom elements can be created using a custom element definition tool within a graphical modeling interface. The user-defined custom element can include one or more static graphical elements and/or one or more semantic data elements. A user-defined custom element can be contained within a custom element definition file. A copy of the custom element definition file can be distributed to multiple users of the graphical modeling application.

BRIEF DESCRIPTION OF THE SEVERAL VIEWS OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
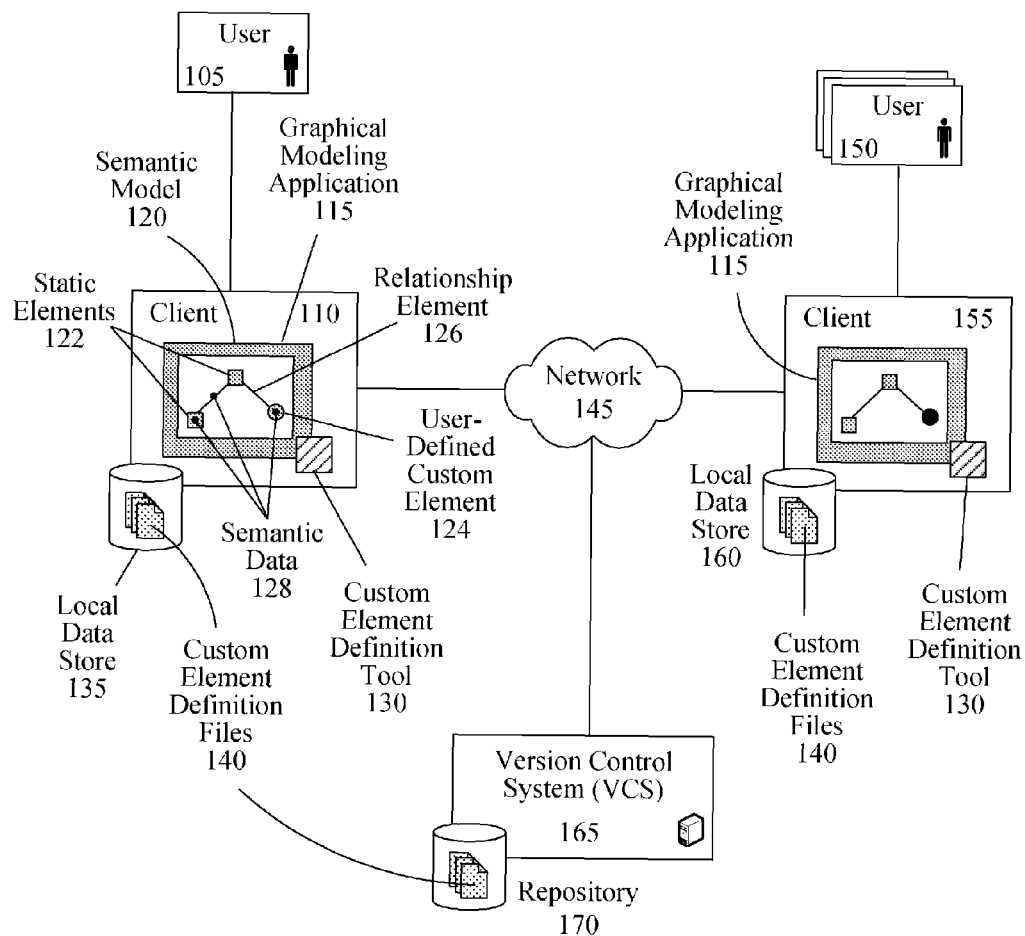
FIG. 1 is a schematic diagram illustrating a system that simplifies the creation of user-defined custom elements for use in a graphical modeling application in accordance with embodiments of the inventive arrangements disclosed herein.

The present invention discloses a solution that can simplify the creation of user-defined custom elements for use in a graphical modeling application. This solution can utilize a custom element definition tool to capture elements identified by a user within the graphical modeling application. The custom element definition tool can save the captured elements as a user-defined custom element. The user-defined custom element can be stored as one or custom element definition files local to the graphical modeling application. The custom element definition tool can then interface with the graphical modeling application to make the user-define custom element accessible within the graphical modeling application. Further, the custom element definition files can be distributed to other users to share the user-defined custom element.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 that simplifies the creation of user-defined custom elements 124 for use in a graphical modeling application 115 in accordance with embodiments of the inventive arrangements disclosed herein. In system 100, a user 105 can create user-defined custom elements 124 using a custom element definition tool 130 that can be used within the graphical modeling application 115.

The user 105 can utilize the graphical modeling application 115 on a client device 110. The graphical modeling application 115 can represent a variety of software applications designed for the creation and/or manipulation of semantic models 120. A semantic model 120 created within the graphical modeling application 115 can include static elements 122, relationship elements 126, user-defined custom elements 124, and semantic data 128.

It is important to emphasize that the semantic models 120 of system 100 can utilize various model types, modeling languages, and/or degrees of complexity. Examples of modeling types upon which the semantic model 120 can be based can include, but are not limited to, the Component Object Model (COM), the Document Object Model (DOM), the System Object Model (SOM), the Network Object Model (NOM), the Topology Definition Model (TDM), and the like.

These various model types can support a variety of modeling languages, including, but not limited to, the Unified Modeling Language (UML), the Business Process Execution Language (BPEL), the Model Definition Language (MDL), the Business Process Modeling Notation (BPMN), the Web Services Choreography Description Language (WS-CDL), and the like. It is important to note that the specific model type and/or modeling language used needs to be supported by the graphical modeling application 115.

Additionally, the semantic model 120 can contain multiple levels of complexity as found in the real-world system that it represents. For example, a semantic model 120 of an enterprise business system can be modeled using the Topology Definition Model (TDM). Such a semantic model 120 can capture the relationship elements 126 between various business applications and their corresponding server elements 122 as well as the semantic data 128 that describes the mapping between them. For example, the business application can require a specific version of database software, which can only be installed on a specific type of server.

The static elements 122 can represent the multitude of graphical elements that come packaged with the graphical modeling application 115, such as the rectangles and diamonds of a flow chart. It is important to note that the basic definition of the static elements 122 is not modifiable by the user. That is, a user cannot change a static rectangle element 122 to a circular static element 122.

Relationship elements 126 can represent the variety of graphical relational connectors that can be created between static elements 122. Examples can include, but are not limited to, solid lines, single arrowhead lines, double arrowhead lines, dashed lines, and the like.

A user-defined custom element 124 can represent a dynamic element defined by the user 105 using the custom element definition tool 130. The user-defined custom element 124 can be a configuration of static elements 122 and relationship elements 126 selected by the user 105. For example, static elements 122 representing a computer, a data store, and a software program can be connected by relationship elements 126 to be stored as a database server custom element 124. Unlike the static elements 122 of the graphical modeling application 115, the definition of the user-defined custom element 124 can be modified by the user 105.

Static elements 122, user-defined custom elements 124, and relationship elements 126 can additionally include semantic data 128. The semantic data 128 can represent a variety of data items that can be defined and associated with the other elements 122, 124, and 126. For example, a relationship element 126 can have a specified cardinality or type that defines the association between the static 122 and/or user-defined custom elements 124.

It is important to note that user-defined custom elements 124 created within the means of current graphical modeling applications 115 lack the inclusion of the semantic data associated with their constituents. That is, current graphical modeling applications 115 can only capture the graphical presentation of the user-defined custom element 124 without the underlying semantic data 128.

The user-defined custom element 124 can be created by the custom element definition tool 130. The custom element definition tool 130 can represent a software program configured to capture the graphical and semantic elements 122, 126, and 128 of a user-defined custom element 124 and interface with the graphical modeling application 115 to make the user-defined custom element 124 accessible to the user 105. The custom element definition tool 130 can automate the definition process used by current graphical modeling applications 115, such as interfacing with the API of the graphical modeling application 115.

The custom element definition tool 130 can be invoked by the user 105 from within the graphical modeling application 115, such as through a menu item in a context menu. When defining a custom element 124, the custom element definition tool 130 can utilize a user interface (not shown) to request additional identifying information, such as a label and a description, for the custom element 124.

The custom element definition tool 130 can generate one or more custom element definition files 140 to contain the user-defined custom element 124. It is important to emphasize that the custom element definition files 140 detail not only the graphical configuration of the custom element 124, but also includes the semantic data 128.

The custom element definition files 140 can be stored in a data store 135 local to the client device 110 and accessible by the graphical modeling application 115. The storage location of the custom element definition files 140 for the user-defined custom element 124 can be entered by the user 105 as identifying information.

Once the user-defined custom element 124 is saved and made accessible to the graphical modeling application 115, the user 105 can utilize the custom element 124 within the graphical modeling application 115 like other static elements 122. For example, the custom element 124 can be displayed within a selection palette where the user 105 can drag the custom element 124 into a semantic model 120. Unlike the other static elements 122, the user 105 can be presented with additional commands for the modification of the custom element 124.

Since the user-defined custom element 124 is encapsulated in the custom element definition files 140, a copy of the user-defined custom element 124 can be shared with other users 150 utilizing the graphical modeling application 115 and custom element definition tool 130. A copy of the custom element definition files 140 can be transmitted over a network 145 to the client device 155 of another user 150.

User 150 can store the custom element definition files 140 in storage location within a data store 160 that is identical to that of the authoring user 105. The custom element definition tool 130 can interface with the graphical modeling application 115 to enable the user 150 to utilize the user-defined custom element 124.

Further, the custom element definition files 140 can be managed like other business documents using a version control system (VCS) 165. A copy of the custom element definition files 140 can be transmitted over a network 145 for storage in the repository 170 of the VCS 165. The custom element definition files 140 stored within the repository 160 can accessed by additional users 150, who can store a copy of the custom element definition files 140 in their local data store 160.

Network 145 can include any hardware/software/and firmware necessary to convey data encoded within carrier waves. Data can be contained within analog or digital signals and conveyed though data or voice channels. Network 145 can include local components and data pathways necessary for communications to be exchanged among computing device components and between integrated device components and peripheral devices. Network 145 can also include network equipment, such as routers, data lines, hubs, and intermediary servers which together form a data network, such as the Internet. Network 145 can also include circuit-based communication components and mobile communication components, such as telephony switches, modems, cellular communication towers, and the like. Network 145 can include line based and/or wireless communication pathways.

As used herein, presented data stores 135, 160, and 170 can be a physical or virtual storage space configured to store digital information. Data stores 135, 160, and 170 can be physically implemented within any type of hardware including, but not limited to, a magnetic disk, an optical disk, a semiconductor memory, a digitally encoded plastic memory, a holographic memory, or any other recording medium. Data stores 135, 160, and 170 can be a stand-alone storage unit as well as a storage unit formed from a plurality of physical devices. Additionally, information can be stored within data stores 135, 160, and 170 in a variety of manners. For example, information can be stored within a database structure or can be stored within one or more files of a file storage system, where each file may or may not be indexed for information searching purposes. Further, data stores 135, 160, and/or 170 can utilize one or more encryption mechanisms to protect stored information from unauthorized access.

Figure 2:
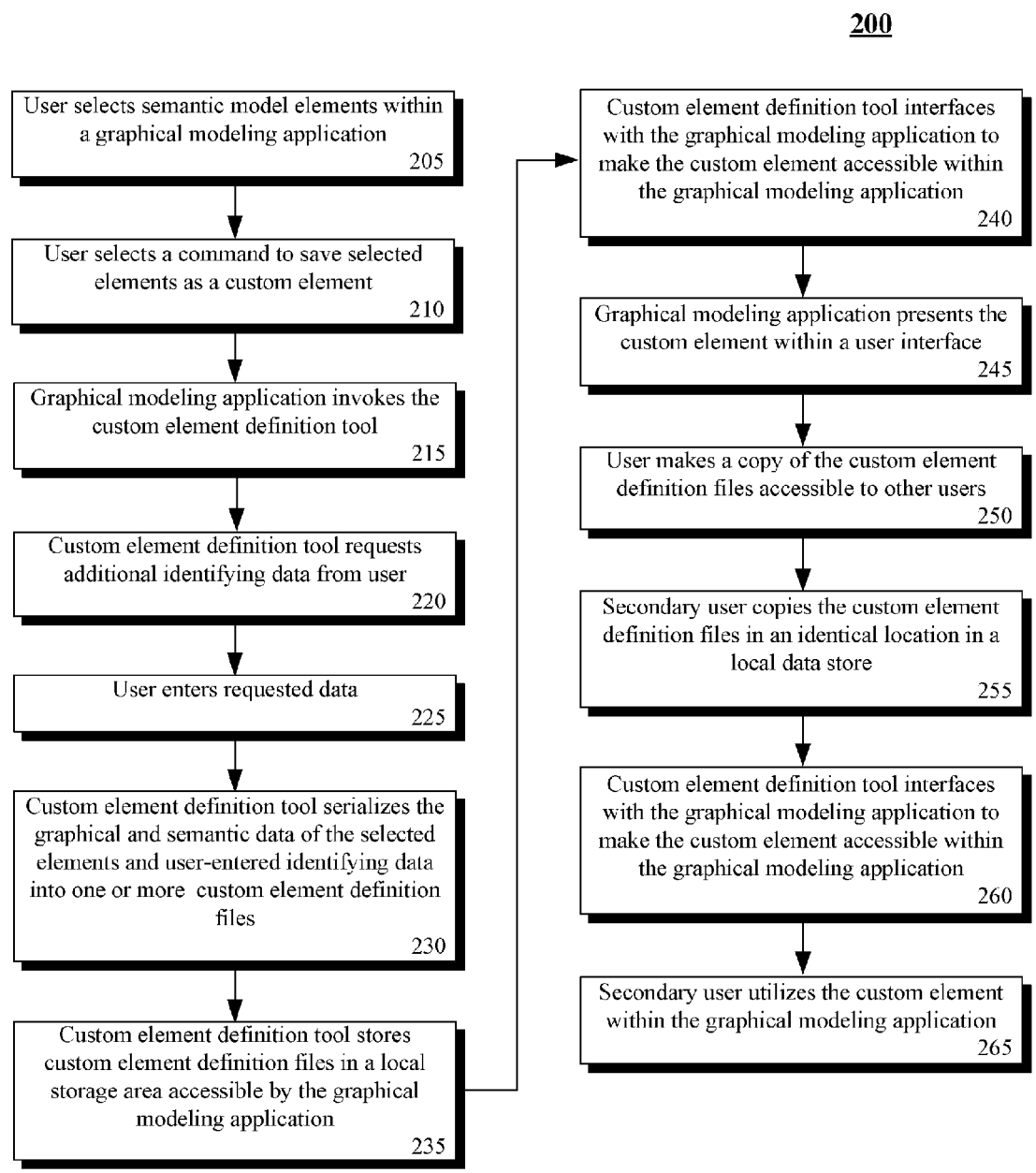
FIG. 2 is a flow chart of a method detailing the use of a custom element definition tool to simplify the creation and sharing of a user-defined custom element within a graphical modeling application in accordance with an embodiment of the inventive arrangements disclosed herein.

FIG. 2 is a flow chart of a method 200 detailing the use of a custom element definition tool to simplify the creation and sharing of a user-defined custom element within a graphical modeling application in accordance with an embodiment of the inventive arrangements disclosed herein. Method 200 can be performed in the context of system 100 or any other system that utilizes a custom element definition tool to simplify the creation and sharing of a user-defined custom element within a graphical modeling application.

Method 200 can begin with step 205 where a user can select semantic model elements within a graphical modeling application. It is important to note that the selected semantic model elements can include static graphical elements and the relationship elements and semantic data between the static graphical elements. The user can select a command to save the selected elements as a custom element in step 210. In step 215, the graphical modeling application can invoke the custom element definition tool.

The custom element definition tool can request additional identifying data from the user in step 220. In step 225, the user can entered the requested data. The custom element definition tool can serialize the graphical and semantic data of the selected elements and the user-entered identifying information into one or more custom element definition files in step 230.

In step 235, the custom element definition tool can store the custom element definition files in a local storage are that can be accessed by the graphical modeling application. The custom element definition tool can interface with the graphical modeling application to make the custom element accessible within the graphical modeling application in step 240.

In step 245, the graphical modeling application can present the custom element within a user interface. The user can make a copy of the custom element definition files accessible to other users in step 250. A secondary user can copy the custom element definition files to an identical location in a local data store in step 255.

In step 260, the custom element definition tool can interface with the graphical modeling application to make the custom element accessible within the graphical modeling application. The secondary user can utilize the custom element within the graphical modeling application in step 265.

Figure 3:
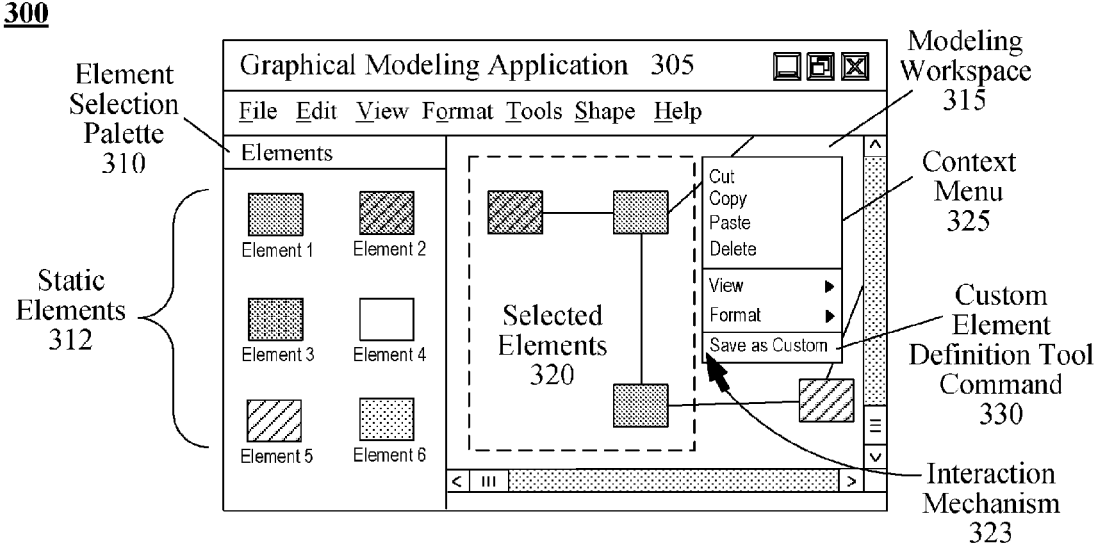
FIG. 3 is a collection of graphical modeling application interfaces illustrating the simplified creation of user-defined custom elements for use in a graphical modeling application in accordance with an embodiment of the inventive arrangements disclosed herein.
Figure 3:
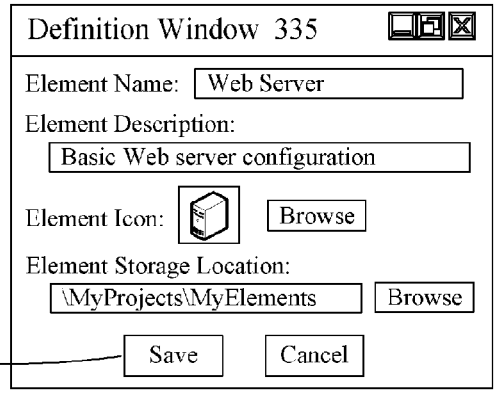
Figure 3:
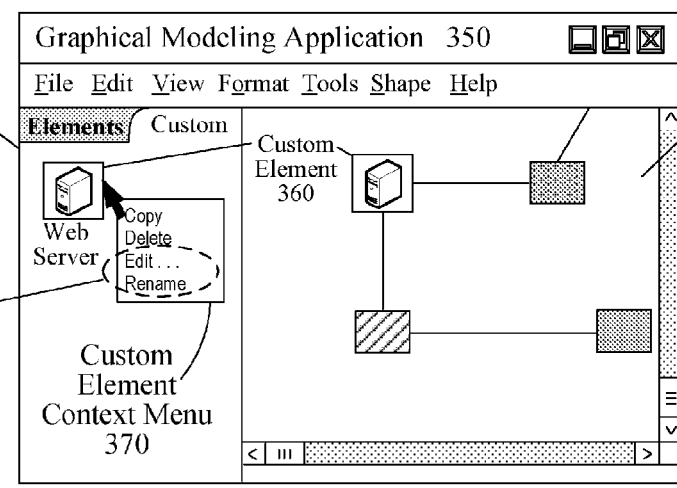

FIG. 3 is a collection 300 of graphical modeling application interfaces 305, 335, and 350 illustrating the simplified creation of user-defined custom elements 360 for use in a graphical modeling application 305 in accordance with an embodiment of the inventive arrangements disclosed herein.

The interfaces 305, 335, and 350 of collection 300 can be utilized by system 100 or can be performed within the context of method 200.

Interface 305 can illustrate a general user interface of a graphical modeling application in which a user can create a user-defined custom element 360. The interface 305 can include an element selection palette 310 and a modeling workspace 315. The element selection palette 310 can be configured to visually present a multitude of static elements 312 for use within the modeling workspace 315.

Static elements 312 can be placed by a user from the element selection palette 310 and into the modeling workspace 315. The modeling workspace 315 can represent an area of the interface 305 where the user can view and/or manipulate static elements 312 to build a semantic model.

An interaction mechanism 323, such as a mouse, can be used by the user to identify selected elements 320 of a semantic model to save as a user-defined custom element 360. Identification of the selected elements 320 can be performed in a variety of manners, including, but not limited to, a selection tool, a context menu command, a series of keystrokes, a combination of one or more keystrokes and/or one or more mouse clicks, a toolbar command, a drag-and-drop behavior, and the like. In this example, the selected elements 320 have been identified with a rectangular box selection tool.

Once the selected elements 320 have been identified, the user can request to store the selected elements 320 as a user-defined custom element 360. Requesting to store the selected elements 320 as a user-defined custom element 360 can invoke the custom element definition tool. The invocation of the custom element definition tool can be requested in a variety of ways, including, but not limited to, a context menu command, a toolbar button, a shortcut key, and interface button, and the like.

It should be noted that the invocation of the custom element definition tool to create the user-defined custom element 360 can appear transparent to the user, such as through the use of a menu command 330 as shown in this example. That is, the invocation of the custom element definition tool can appear similar to any other functions provided by the graphical modeling application.

In this example, the user has accessed a context menu 325 with the interaction mechanism 323. From the context menu 325, the user can select a command 330 that can invoke the custom element definition tool.

Selection of the custom element definition tool command 330 can present the user with a definition window 335. The definition window 335 can allow the user to enter additional identifying data items 340 necessary for the custom element definition tool to save the user-defined custom element 360. As shown in this example, the identifying data items 340 include the element name, the element description, the icon to visually represent the user-defined custom element 360, and the location where the custom element definition files are to be stored.

Once the identifying data items 340 have been entered, the user can select the save button 345 to finalize the transaction. The custom element definition tool can then store the selected elements 320 and make them accessible within the interface 350 of the graphical modeling application as a user-defined custom element 360.

The custom element 360 can be presented to the user within the element selection palette 355. To emphasize the distinction of the custom element 360 to the user, the element selection palette 355 can present the custom element 360 in an area separate to the static elements. The user can utilize the custom element 360 from the element selection palette 355, such as by placing it in the modeling workspace 315.

Unlike the static elements 312 of interface 305, the custom element 360 can have an associated set of modification commands 365 that can be accessed within the interface 350. As shown in this example, the modification commands 365 can be accessed via a custom element context menu 370. A selection of a modification command 365 by the user can allow the contents, semantic, textual, and graphical, of the custom element 360 to be changed.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system that simplifies the creation of user-defined custom elements for use in a graphical modeling application comprising:
    a graphical modeling application configured to graphically facilitate a creation of a semantic model utilizing a plurality of static graphical elements and a plurality of semantic data elements; and
    a custom element definition tool configured to facilitate a creation of a user-defined custom element within the graphical modeling application, wherein the user-defined custom element comprises at least one of at least one static graphical element and at least one semantic data element.

2. The system of claim 1, wherein the custom element definition tool generates at least one custom element definition file during the creation of the user-defined custom element, wherein the at least one custom element definition file is stored in a storage location local to and accessible by the graphical modeling application.

3. The system of claim 2, wherein, after a transference of the at least one custom element definition file from an originating device to a secondary device, the user-defined custom element is usable by an instance of the graphical modeling application operating on the secondary device.

4. The system of claim 2, wherein a deletion of the user-defined custom element within the graphical modeling application deletes the at least one custom element definition file.

5. The system of claim 2, wherein, when the user-defined custom element is defined by a plurality of custom element definition files, the plurality of custom element definition files comprises at least one of a template file containing references to the at least one static graphical element contained in the user-defined custom element and a display file.

6. The system of claim 1, wherein the at least one semantic data element comprises at least one of a relationship type of the at least one static graphical element, a requirement of the at least one static graphical element, a metadata value of the at least one static graphical element, and a property of the at least one static graphical element, and, wherein the at least one semantic data element represents a complex relationship between at least two static graphical elements.

7. The system of claim 1, wherein the user-defined custom element created by the custom element definition tool is accessible within a user interface of the graphical modeling application.

8. The system of claim 1, wherein the user-defined custom element defines a static graphical element absent from the plurality of static graphical elements available in the graphical modeling application.

9. A method for simplifying the creation of user-defined custom elements for use in a graphical modeling application comprising:
    capturing compositional data and semantic data related to at least one user-selected static graphical element of a semantic model within a graphical modeling application;
    storing the captured compositional data and semantic data as a user-defined custom element within at least one custom element definition file in a user-specified location, wherein the user-specified location is local to and accessible by the graphical modeling application; and
    automatically registering the user-defined custom element with the graphical modeling application, wherein the user-defined custom element is made accessible from within the graphical modeling application.

10. The method of claim 9, wherein the capturing step further comprises:
    receiving a plurality of user-configurable data items that identify the user-defined custom element.

11. The method of claim 10, wherein the plurality of user-configurable data items comprise at least one of an identifier for the user-defined custom element, a textual description of the user-defined custom element, an icon to graphically represent the user-defined custom element, and a storage location for the user-defined custom element.

12. The method of claim 9, wherein the semantic data comprises at least one of a relationship type of the at least one static graphical element, a requirement of the at least one static graphical element, a metadata value of the at least one static graphical element, and a property of the at least one static graphical element.

13. The method of claim 9, wherein, when the user-defined custom element is stored as a plurality of custom element definition files, the plurality of custom element definition files comprises at least one of a template file containing the captured compositional and semantic data and a display file.

14. The method of claim 9, wherein the registering step utilizes an application programming interface (API) of the graphical modeling application.

15. The method of claim 9, wherein said steps of claim 9 are performed by at least one machine in accordance with at least one computer program stored in a computer readable media, said computer programming having a plurality of code sections that are executable by the at least one machine.

16. A method for sharing user-defined custom elements for use in a graphical modeling application comprising:
creating a user-defined custom element using a custom element definition tool within a graphical modeling interface, wherein the user-defined custom element comprises at least one of at least one static graphical element and at least one semantic data element, and, wherein the user-defined custom element is contained within at least one custom element definition file; and
distributing a copy of the at least one custom element definition file to a plurality of users of the graphical modeling application.

17. The method of claim 16, wherein the distributing step further comprises:
storing the copy of the at least one custom element definition file within a version control system (VCS).

18. The method of claim 17, wherein a listening mechanism associated with the VCS synchronizes the stored copy of the at least one custom element definition file with the copy provided to the plurality of users.

19. The method of claim 16, wherein, when the user-defined custom element is stored as a plurality of custom element definition files, the plurality of custom element definition files comprises at least one of a template file and a display file.

20. The method of claim 16, further comprising:
storing the provided copy of the at least one custom element definition file at a specified path within a local data store; and
the plurality of users independently accessing the user-defined custom element within the graphical modeling application.

* * * * *